No. 872,177. PATENTED NOV. 26, 1907.
O. HAMMERSTEIN.
CIGAR BUNCH FORMING APPARATUS.
APPLICATION FILED JUNE 25, 1904.

Witnesses:
John Lotka
John A. Kehlenbeck

Inventor:
Oscar Hammerstein
By
his Attorneys

UNITED STATES PATENT OFFICE.

OSCAR HAMMERSTEIN, OF NEW YORK, N. Y.

CIGAR-BUNCH-FORMING APPARATUS.

No. 872,177.  Specification of Letters Patent.  Patented Nov. 26, 1907.

Application filed June 25, 1904. Serial No. 214,082.

*To all whom it may concern:*

Be it known that I, OSCAR HAMMERSTEIN, a citizen of the United States, and resident of the borough of Manhattan, city, county, and State of New York, have invented certain new and useful Improvements in Cigar-Bunch-Forming Apparatus, of which the following is a specification.

My invention relates to an apparatus for forming a so-called bunch in the manufacture of cigars and cheroots, and has for its object to provide a simple apparatus for properly forming such a bunch.

The invention will be fully described hereinafter and the features of novelty pointed out in the appended claims.

Reference is to be had to the accompanying drawings, in which

Figure 1:
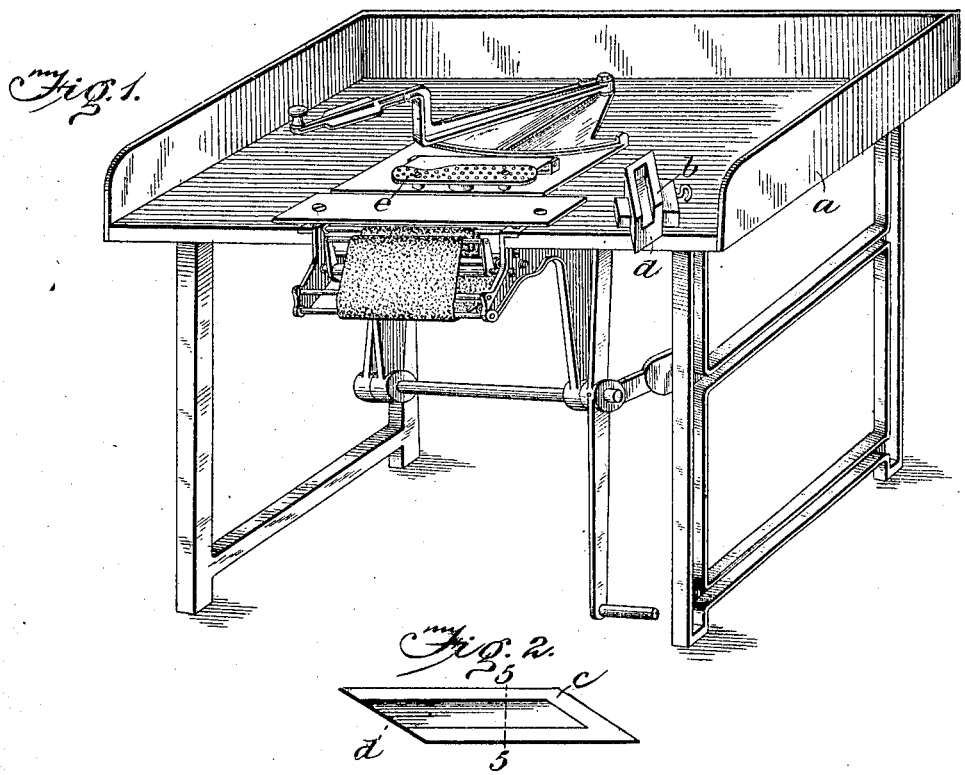
Figure 2:
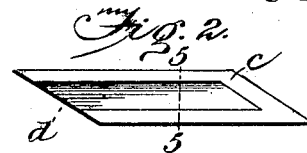
Figure 3:
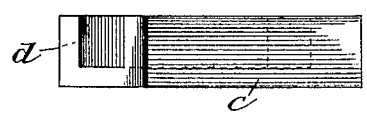
Figure 4:
Figure 5:

Figure 1 is a perspective view of a cigar-making machine embodying my invention; Fig. 2 is a plan of the bunch-forming trough; Fig. 3 is a side elevation of the trough, Fig. 4 is a plan showing another form of trough, and Fig. 5 is a sectional view on the line 5—5 of Fig. 1.

The bunch-forming trough $b$ is carried by a suitable support such as a table $a$ which in the construction illustrated by Fig. 1, also carries other instrumentalities, such as devices for cutting the wrapper and for placing it around the bunch. My present application however, relates exclusively to the bunch-forming trough $b$. In the construction shown in Figs. 1, 2 and 3, the trough $b$ has an inclined rear wall $c$ and a cutting or tearing edge $d$. This edge $d$ preferably has a free space beneath it, which may be accomplished as shown by allowing the said edge to project beyond the table $a$, or in any other suitable way, so as to leave a free space for the insertion of a knife or the operator's fingers. The form of trough shown in Fig. 4 differs from that first described by having both ends open and provided with cutting edges $d$, $d'$.

The apparatus is used as follows: The operator takes the leaf tobacco from which the bunch is to be formed, and places a length thereof in the trough sufficient to cover the bottom thereof, and thereupon tears off the projecting portion of the leaf against the edge or corner $d$, thereby giving said leaf a cut of a general angular shape. The same procedure is then gone through with another leaf placed on top of the first, and this process is repeated until the trough has become full or substantially so, whereby a bunch is preliminarily formed having a taper at each end. This bunch is subsequently manipulated to form a cigar or cheroot in any suitable manner, for instance by means of the rolling mechanism described in my application for a patent, Serial No. 329,979, filed August 10, 1906.

In the drawings, for the sake of convenience, I have shown the two ends of the trough as inclined or beveled at the same angle, but it will be understood that they may be beveled at different angles in order to conform to various shapes of bunches.

I claim as my invention:

1. A cigar bunch-forming apparatus consisting of a trough having an inclined edge or abutment in a free space so as to facilitate the insertion of a knife or the fingers of the operator.

2. A cigar bunch forming apparatus consisting of a trough having an open end with an inclined free cutting edge.

3. A cigar bunch-forming apparatus consisting of a trough closed at one end and having a free cutting edge or abutment at the other end which is open.

4. A cigar bunch-forming apparatus consisting of a trough having an inclined wall at one end and a free cutting edge or abutment at the other end.

5. A cigar bunch-forming apparatus comprising a table or support and a trough carried by said support and projecting therefrom, the projecting portion of the trough being provided with a cutting edge or abutment.

OSCAR HAMMERSTEIN.

Witnesses:
 GEO. E. MORSE,
 CONRAD KREMP.